United States Patent Office 3,717,271
Patented Feb. 20, 1973

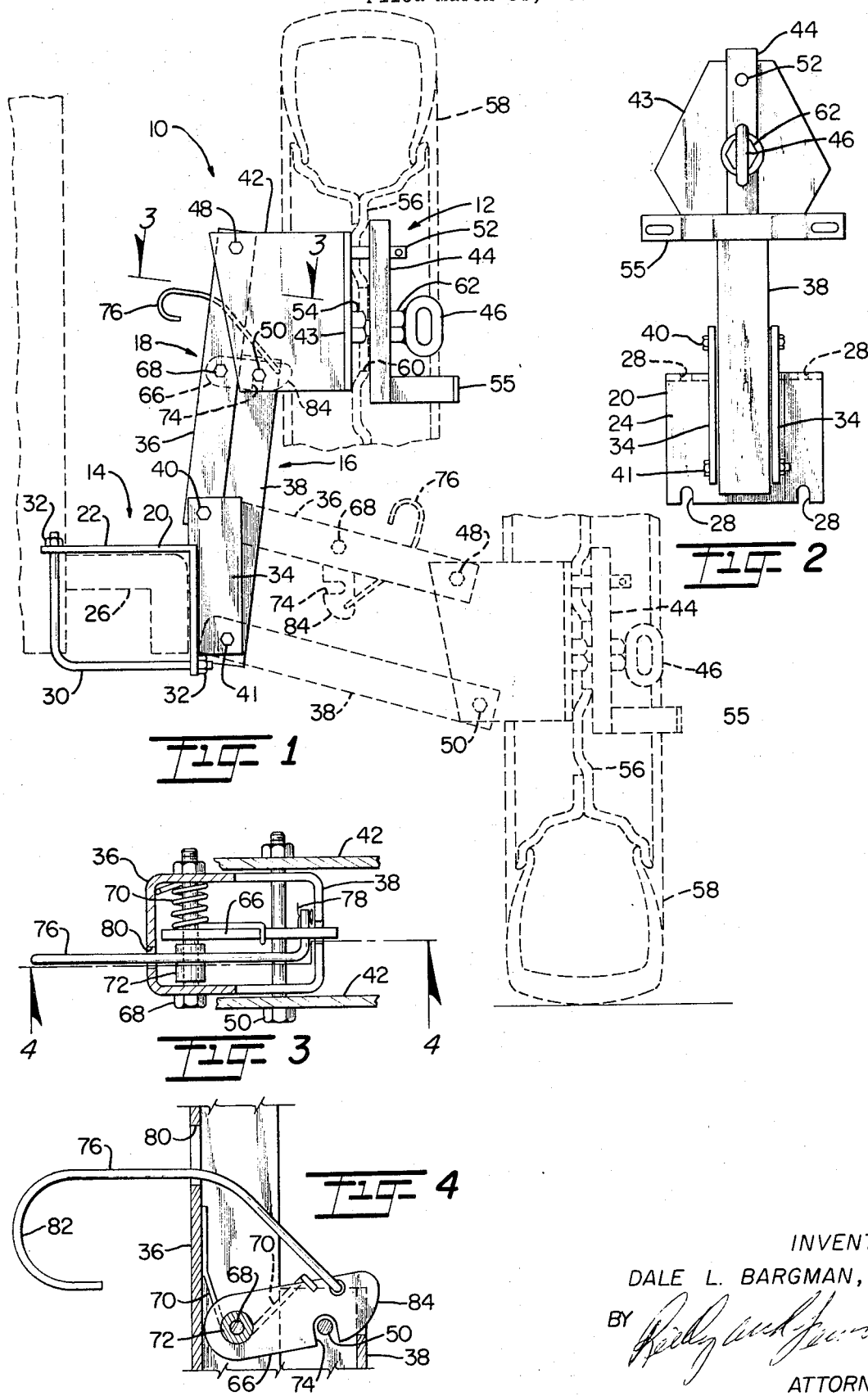

3,717,271
VEHICLE TIRE CARRIER
Dale L. Bargman, Jr., Broomfield, Colo., assignor to Colorado Leisure Products, Inc., Broomfield, Colo.
Filed Mar. 30, 1971, Ser. No. 129,331
Int. Cl. B62d 43/00
U.S. Cl. 214—451                    9 Claims

ABSTRACT OF THE DISCLOSURE

A tire carrier adapted to be secured to the rear bumper of a truck-type vehicle is characterized by a rugged, heavy-duty parallelogram linkage which supports the tire in a raised transport position against the rear of the vehicle and which may be selectively lowered to a removal position wherein the tire rests in an upright position on the ground. The carrier is provided with an automatic latch to secure the carrier in its raised position and a trigger release to allow the carrier to swing down to its lower removal position.

BACKGROUND OF THE INVENTION

Field of the invention

This invention relates to vehicle equipment or accessory carriers, and more specifically relates to a spare tire carrier for a camper, pick-up truck, or other related truck-type vehicle which is capable of releasably but securely mounting spare tires or other equipment on the exterior of the vehicle.

Description of the prior art

Spare tires for vehicles frequently must be stowed inside the rear portion of the body of the vehicle so as to occupy valuable cargo space, or must be stored beneath the vehicle in a relatively inaccessible and out-of-the-way location making it awkward and difficult to remove the tire when needed. To avoid carrying the spare tire in either of these undesirable locations, numerous devices have been devised which are adapted to carry the tire on the outside of the vehicle so as not to rob the vehicle of cargo space and to permit the tire to be more readily accessible and convenient to remove.

Devices typical of this type of tire carrier are disclosed in U.S. Pat. No. 3,019,928 issued to M. W. Mullins on Feb. 6, 1962; U.S. Pat. No. 1,879,304 issued to D. S. Kennedy et al., on Sept. 27, 1932; and U.S. Pat. No. 1,849,855 issued to F. A. Stutsman et al., on Mar. 15, 1932.

SUMMARY OF THE INVENTION

The vehicle tire carrier of the present invention is of the type which releasably supports the tire on the outside of the vehicle in a readily accessible position. It is provided with an attaching assembly to which a spare wheel of the vehicle can be removably affixed. The wheel-attaching assembly is secured to the end of a parallelogram linkage. The other end of the parallelogram linkage is pivotally connected to a conventional universal type mounting bracket adapted to be clamped to the rear bumper of the vehicle.

The parallelogram linkage is a rugged heavy duty structure which makes it possible to swing between a raised transport position against the rear end of the vehicle and a lowered, outwardly extending, ground-engaging position. In this lower position, the tire can be readily removed from the carrier and easily rolled away. The carrier is provided with an automatic latch device which locks the carrier in its raised transport position whenever it is pivoted upwardly to this position. The automatic latch device includes a trigger release that allows the carrier to drop down until the tire engages the ground.

Accordingly, it is an object of the present invention to provide a vehicle tire carrier which is adapted to be carried on the outside of the vehicle in a convenient location.

It is another object of the present invention to provide a vehicle tire carrier in which the tire can be secured in a raised, vertical transport position and can be lowered until the tire engages the ground in a vertical position so that the tire can be quickly released and easily rolled away.

It is still another object to provide a vehicle tire carrier which is self-locking in its normal transport position.

BRIEF DESCRIPTION OF THE DRAWINGS

FIG. 1 is a side elevation of the tire carrier of the present invention shown in full in the raised transport position and shown in dotted lines in the lowered ground-engaging position.

FIG. 2 is a front elevation of the tire carrier shown in FIG. 1.

FIG. 3 is a fragmentary section taken along line 3—3 of FIG. 1.

FIG. 4 is a fragmentary section taken along line 4—4 of FIG. 3.

DESCRIPTION OF A PREFERRED EMBODIMENT

The vehicle tire carrier 10 of the present invention, as best seen in FIG. 1, comprises a wheel-attaching assembly 12, a mounting bracket 14 for securing the carrier to a vehicle, a parallelogram linkage 16 connecting the mounting bracket to the wheel-attaching assembly and an automatic latch device 18 for locking the carrier in a raised transport position.

The mounting bracket 14 shown in FIGS. 1 and 2 is seen to be generally rectangular and includes a rigid right angle corner plate 20 having rigidly interconnected horizontal and vertical flanges 22 and 24 respectively. The plate is adapted to conform to the outside of a bumper 26 of a pick-up truck, camper or other like vehicle. The corner plate has two laterally spaced notches 28, as in FIG. 2, in each of its two upper and lower, outer free edges to receive the threaded end portions of a pair of L-shaped bolts 30, as shown in FIG. 1. The bolts 30 are adapted to extend around the rear portion of the bumper and are attachable to the corner plate 20 by nuts 32 so that the corner plate can be tightly fastened against the bumper 26 and thereby securely affixed to the vehicle. Welded or otherwise connected to the vertical segment 24 of the corner plate are a pair of spaced, parallel forwardly extending brackets or ears 34 to which the parallelogram linkage 16 is pivotally attached in a manner to be described hereinafter.

The parallelogram linkage 16 is comprised of two channeled arms 36 and 38, generally U-shaped in cross-section which are arranged in opposed facing relation to one another. Arm 36 is pivotally mounted at one end between the ears 34 of the mounting bracket on a bolt 40 that passes horizontally through the upper aligned openings in the ends of the ears and opposite sides of the upper end of the arm 36. Similarly, arm 38 is pivotally mounted at its upper end between the ears 34 on a bolt 41 that passes horizontally through aligned openings in the lower ends of the ears and opposite sides of the end of the arm 38. The opposite ends of the arms 36 and 38 are connected to the rear portion of the tire attaching assembly 12.

The attaching assembly includes a pair of spaced vertical support plates 42, a vertical backing plate 43 welded or otherwise secured to the forward edges of the support plates, a clamping bar 44, and a thumbscrew 46 for removably attaching the clamping bar to the backing plate 43.

The ends of the arms 36 and 38 opposite to those connected to the mounting bracket 14 are pivotally attached near the upper and lower edges of the support plates 42 by means of horizontal bolts 48 and 50, respectively. Thus, a parallelogram linkage is effectively formed between the ears 34, arms 36 and 38 and the plates 42; and as a result, the attaching assembly 12 can be swung from the raised solid line position of FIG. 1 to the lowered dotted line position while retaining the backing plate 43 in a vertical spaced orientation.

The backing plate 43 has protruding from an upper portion thereof a positioning pin 52. The plates are also provided with a centrally located opening which is aligned with the threaded opening in a nut 54 welded to the front face of the backing plate.

The clamping bar 44 has an opening in its upper end to receive the positioning pin 52 and an opening near its center to receive the thumbscrew 46. Also a bracket 55 is secured to the lower edge of the bar with means for attaching a vehicle license plate if desired.

As seen in FIG. 1, a vehicle wheel 56 with a tire 58 is attached to the carrier 10 between the backing plate 43 and the clamping bar 44. The positioning pin 52 on the backing plate is adapted to fit through any one of the stud holes in the wheel 56 so that the central axle opening 60 in the wheel surrounds the internally threaded lock nut 54 affixed to the backing plate. The wheel 56 is held on the carrier by the clamping bar 44 which is tightened against the outer face of the wheel by screwing the thumbscrew into the lock nut 54. The thumbscrew is seen to have a hexagonal shank portion 62 near its head so that it can be tightened with a wrench if desired.

An important feature of the tire carrier resides in the automatic latch device 18, particularly in cooperation with the channel-shaped housing formed by the parallelogram linkage. The latch device, as shown in FIGS. 1, 3 and 4, includes a catch arm 66 pivotally mounted at one end on a bolt 68 passing horizontally through the channeled arm 36 of the parallelogram linkage. The bolt 68 carries on one side of the catch arm a torsion spring 70 which operably engages the catch arm to bias the catch arm in a clockwise direction as viewed in FIGS. 1 and 4. On the other side of the catch arm the bolt 68 carries a spacer ring 72 to position the catch arm on the bolt. The catch arm has a notch 74 cut in its underside adapted to fit on the bolt 50 when the carrier 10 is raised in its transport position shown in solid lines in FIG. 1. When the bolt 50, which serves as a catch rod, is in the notch 74, the tire carrier will be retained in the raised position. It is important again to note that the catch arm is biased clockwise, as viewed in FIGS. 1 and 3, to hold the arm down over the bolt 50 thereby to lock the carrier in the raised position. In order to release the latch, it is provided with a relatively rigid trigger 76 pivotally secured to the notched end of the catch arm by a cotter pin 78. The trigger extends through an opening 80 in the channeled arm 36 and has a curved end portion 82 to facilitate manual manipulation. As can be seen in FIGS. 1 and 3, when the carrier is in its raised position, the trigger extends upwardly as well as rearwardly from the notched end of the catch arm to provide leverage in pivoting the catch to unlock the latch. It should also be noted that the catch arm has a curved cam surface 84 along the underside of its notched end whereby when the carrier is swung upwardly to its raised position the cam surface will engage the bolt 50 causing the catch arm to lift up and subsequently snap onto the bolt 50 due to the bias exerted thereon by the torsion spring 70. It is thus apparent that the tire carrier 10 will automatically lock in its raised transport position when it is raised far enough for the catch arm to latch onto the bolt 50.

From the above description it can be seen that when the carrier is in its raised transport position and it is desired to remove the tire 58 from the carrier, one must merely pull the trigger 76 causing the catch arm 66 to lift off the bolt 50 whereby the carrier will swing down due to gravity until the tire engages the ground. Because of the parallelogram linkage the tire, which is vertically disposed when supported in the raised transport position, will also be vertically disposed when engaging the ground. The clamping bar 44 can then be readily separated from the backing plate 43 by unscrewing the thumbscrew 46 and the tire slipped off the positioning pin 52 and rolled away. Therefore, the tire can be removed from the carrier 10 without ever lifting the tire or otherwise manually supporting it.

A number of advantages accrue from the type of parallelogram linkage and latching device described. The channeled arms 36 and 38 together with the plates 34 and 42 at opposite ends greatly minimize any lateral or torsional instability which might otherwise result from the load of the tire at its outer face end; yet permits the desired degree of movement in the vertical direction in swinging between the extreme positions. Moreover, as best seen from FIG. 1, it will be noted that the channel arms 36 and 38 will move with respect to one another between an upright closed position forming a common rectangular housing and a lower open, spaced-apart position.

To remount another tire in place it is only necessary to roll the tire adjacent the backing plate 43, insert the positioning pin into one of the stud holes in the wheel 56 and clamp the wheel onto the backing plate by securing the clamping bar with the thumbscrew 46. With the wheel securely clamped on the backing plate the carrier can be swung up to its raised position wherein it will automatically lock when the catch arm 66 snaps onto the bolt 50. Of course the assembly described can be readily adapted for mounting other accessories and equipment where it is desired to be able to raise and lower same for storage and removal, respectively.

Although the best mode contemplated for carrying out the present invention has been herein shown and described, it will be apparent that modification and variation may be made without departing from what is regarded to be the subject matter of the invention.

What is claimed is:

1. A vehicle equipment carrier comprising in combination, a mounting bracket adapted to be secured to the bumper of a vehicle, an equipment attaching assembly to which equipment can be releasably attached, a parallelogram linkage pivotally interconnecting the mounting bracket and the attaching assembly whereby the attaching assembly can be alternately moved between a raised transport position and a lowered removal position, said parallelogram linkage including a pair of parallel channel-shaped arms disposed in opposed facing relation to one another to form a common housing, and a latch substantially mounted in said common housing so as to be protected by said common housing, said latch being self-locking when the attaching assembly is moved into the transport position.

2. The vehicle equipment carrier of claim 1 wherein said channel-shaped arms are movable with respect to one another between a substantially closed position forming the common housing and an open position when said attaching assembly is moved between the transport and removal positions, respectively.

3. The vehicle equipment carrier of claim 1 further including manual release means for releasing said latch to allow said assembly to move into said removal position.

4. A vehicle tire carrier comprising in combination, a releasable mounting bracket for securing the carrier to the bumper of a vehicle, a wheel-attaching assembly including mating threaded members for securing a spare tire for the vehicle to the carrier, a parallelogram linkage pivotally interconnecting the attaching assembly and said mounting bracket whereby the attaching assembly can be alternately swung between a raised transport position and a lowered removal position, said parallelogram linkage including a pair of parallel channel-shaped arms disposed in opposed facing relation to one another to form a common housing when in the transport position, and a latch means substantially in the common housing so as to be protected by the parallelogram linkage when in the transport position, said latch means being self-locking to rigidly interconnect said parallelogram linkage in the raised position and including manual release means to release said latch means to permit downward swinging movement of said parallelogram linkage into the removal position.

5. A vehicle tire carrier according to claim 4, said mounting bracket being of generally rectangular configuration and being defined by a pair of angle members adjustably interconnected to clampingly engage the bumper of the vehicle.

6. A vehicle tire carrier according to claim 4, said parallelogram linkage having opposite sides connected at opposite ends to attaching plates on said mounting bracket and attaching assembly respectively.

7. A tire carrier for camper bodies and the like comprising in combination:
a mounting bracket 14 adapted for attachment to a generally rectangular bumper portion on the camper,
a spare tire attaching assembly 12 adapted for releasable attachment of a spare tire thereto,
parallelogram linkage means 16 pivotally interconnecting said attaching assembly 12 and said mounting bracket 14 for movement of said attaching assembly and attached tire between a raised transport position against the rear end wall of the camper and a lowered position in which the spare tire is in a vertically disposed, ground-engaging position, said parallelogram linkage including a pair of parallel channel-shaped arms disposed in opposed facing relation to one another to form a common housing when in said transport position, and
an automatic latching device 18, said latching device being disposed substantially within said common housing and being spring-loaded to automatically lockingly engage the end of said linkage means connected to said attaching assembly 12 when said attaching assembly is advanced to the raised transport position, said latching device 18 including a trigger release member 76 for manually releasing said latching device 18 from locking engagement with said linkage means 16 in order to permit movement of said attaching assembly from the raised transport position to the lowered position.

8. A vehicle equipment carrier comprising in combination a mounting bracket adapted to be secured to the bumper of the vehicle and an equipment attaching assembly to which equipment can be releasably attached, a parallelogram linkage pivotally interconnecting the mounting bracket and the attaching assembly whereby the attaching assembly can be alternately moved between a raised transport position and a lowered removal position, said parallelogram linkage including a pair of parallel channel shaped arms disposed in opposed facing relation to one another, and a latch being self locking when the attaching assembly is moved into the transport position, said latch including a pivotally mounted catch arm on one of said channel shaped arms and a catch rod on the other said arm.

9. The vehicle equipment carrier of claim 8 wherein said latch means includes a cam surface on the catch arm which is disposed to engage said catch rod.

References Cited

UNITED STATES PATENTS

| 1,849,855 | 3/1932 | Stutsman | 214—451 |
| 1,879,304 | 9/1932 | Kennedy | 214—451 |
| 3,507,414 | 4/1970 | Souza | 214—450 |
| 3,613,971 | 10/1971 | Betz | 224—42.21 |

GERALD M. FORLENZA, Primary Examiner

J. MANNIX, Assistant Examiner

U.S. Cl. X.R.

214—DIG 10